(12) United States Patent
Mizukawa et al.

(10) Patent No.: US 7,503,161 B1
(45) Date of Patent: Mar. 17, 2009

(54) TRANSAXLE FOR LAWN TRACTOR

(75) Inventors: Katsumoto Mizukawa, Amagasaki (JP); Donald Wieber, Morristown, TN (US)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 144 days.

(21) Appl. No.: 11/539,247

(22) Filed: Oct. 6, 2006

(51) Int. Cl.
*A01D 34/00* (2006.01)

(52) U.S. Cl. ........................ 56/14.7; 56/16.7; 56/DIG. 6

(58) Field of Classification Search ............... 56/14.7, 56/16.6, 16.7, 16.9, 320.1, 320.2, DIG. 6, 56/DIG. 22
See application file for complete search history.

(56) References Cited

U.S. PATENT DOCUMENTS

| | | | | |
|---|---|---|---|---|
| 4,345,416 A * | 8/1982 | Cameron | ..................... | 56/13.3 |
| 4,882,940 A * | 11/1989 | Yamaoka et al. | ............ | 74/15.66 |
| 6,390,227 B1 | 5/2002 | Abend et al. | | |
| 6,401,869 B1 * | 6/2002 | Iida et al. | ..................... | 184/6.25 |

* cited by examiner

*Primary Examiner*—Thomas B Will
*Assistant Examiner*—Mai T Nguyen
(74) *Attorney, Agent, or Firm*—Sterne, Kessler, Goldstein & Fox P.L.L.C.

(57) ABSTRACT

A transaxle is provided for a lawn tractor. The lawn tractor includes a prime mover, a mower unit having a grass-discharging duct disposed at a substantially lateral center portion of the mower unit, left and right drive wheels disposed on lateral opposite sides of the grass-discharging duct, and left and right final transmission devices disposed on lateral opposite sides of the grass-discharging duct. The transaxle is disposed above the grass-discharging duct. The transaxle comprises: a transaxle housing; an input shaft having a lower portion extended downward from the transaxle housing; an input pulley provided on the lower portion of the input shaft so as to be disposed between the transaxle housing and the grass-discharging duct; and left and right output shafts projecting laterally from the transaxle housing opposite to each other so as to be drivingly connected to the respective left and right drive wheels through the respective left and right final transmission devices.

12 Claims, 10 Drawing Sheets

TRANSAXLE FOR LAWN TRACTOR

BACKGROUND OF THE INVENTION

1. Field of the Invention

The invention relates to a transaxle disposed above a grass-discharging duct of a mower unit equipped on a lawn tractor.

2. Related Art

As disclosed in U.S. Pat. No. 6,390,227, there is a conventional well-known rear discharge lawn tractor equipped with a mower unit including a mower deck and a grass-discharging duct. The mower deck is provided with rotary blades and a blower which blows grass mowed by the rotary blades into the duct. A grass collection box is disposed behind a rear end of the lawn tractor and connected to the duct so as to catch grass sent from the mower deck through the duct.

In the conventional rear discharge lawn tractor, left and right drive wheels are disposed on left and right sides of the duct. A transaxle having left and right lateral output shafts is disposed on one lateral side of the duct. Left and right final transmission devices (e.g., chains and sprockets, belts and pulleys, or gears) are disposed on respective lateral opposite sides of the duct so that each of the final transmission devices is drivingly interposed between the output shaft and the drive wheel. The transaxle includes a transaxle housing, which incorporates a hydraulic pump, a hydraulic motor fluidly connected to the hydraulic pump, and the left and right output shafts driven by the hydraulic motor.

Further, the conventional rear discharge lawn tractor is equipped with an engine having a vertical output shaft, and the transaxle includes a vertical input shaft (serving as a pump shaft of the hydraulic pump) projecting upward from the transaxle housing. An input pulley is provided on an upper portion of the input shaft projecting upward from the transaxle housing so as to be drivingly connected to a pulley provided on the vertical output shaft of the engine through a belt.

Since the transaxle housing has to be low as to ensure a space for the input shaft with the input pulley projecting upward from the transaxle housing, the transaxle housing is laterally offset from the duct (i.e., disposed on one lateral side of the duct as mentioned above) so as to be prevented from interfering with the duct, thereby restricting the lateral width of the duct. Further, a lateral shaft extended from the output shaft of the transaxle to one of the left and right final transmission devices is passed through a space above the duct, thereby restricting the vertical width of the duct. Consequently, the grass-discharging duct of the conventional lawn tractor is restricted in volume, thereby restricting the grass discharging (collection) speed of the mower unit.

If the transaxle is disposed above the grass-discharging duct, the problem regarding the restriction of the lateral width of the duct is solved. However, another problem arises because the input pulley on the input shaft projecting upward from the transaxle housing becomes too high to be drivingly connected to the pulley on the engine output shaft through a horizontal belt.

SUMMARY OF THE INVENTION

An object of the invention is to provide a transaxle for a lawn tractor, which can increase the volume of a grass-discharging duct of a mower unit, thereby increasing the grass discharging (or collecting) speed of the mower unit.

To achieve the object of the invention, a transaxle is provided for a lawn tractor. The lawn tractor includes a prime mover, a mower unit having a grass-discharging duct disposed at a substantially lateral center portion of the mower unit, left and right drive wheels disposed on lateral opposite sides of the grass-discharging duct, and left and right final transmission devices disposed on lateral opposite sides of the grass-discharging duct. The transaxle is disposed above the grass-discharging duct. The transaxle comprises: a transaxle housing; an input shaft having a lower portion extended downward from the transaxle housing; an input pulley provided on the lower portion of the input shaft so as to be disposed between the transaxle housing and the grass-discharging duct; and left and right output shafts projecting laterally from the transaxle housing opposite to each other so as to be drivingly connected to the respective left and right drive wheels through the respective left and right final transmission devices.

Since the lower portion of the input shaft with the input pulley projects downward from the transaxle housing so as to receive power from a prime mover, the transaxle housing is able to be disposed above the grass-discharging duct, thereby enabling the grass-discharging duct to be laterally expanded so as to increase its volume, and thereby increasing the grass discharging (collection) speed of the mower unit. In addition, the input pulley on the lower portion of the input shaft is low enough as to be drivingly connected to a pulley on a vertical output shaft of a prime mover through a substantially horizontal belt, thereby ensuring a sufficient efficiency of transmitting power between the prime mover and the transaxle.

Preferably, the transaxle further comprises a hydraulic pump and a hydraulic motor. The hydraulic pump is disposed in the transaxle housing so as to be driven by rotating the input shaft. The hydraulic motor is disposed in the transaxle housing so as to be fluidly connected to the hydraulic pump and to drive the left and right output shafts. Therefore, when the lawn tractor is hydraulically driven by the transaxle, a large volume of the grass-discharging duct is ensured.

Preferably, a cooling fan is provided on the lower portion of the input shaft so as to be disposed between the transaxle housing and the grass-discharging duct. Therefore, a dead space around the lower portion of the input shaft is effectively used for arranging the cooling fan while ensuring the above advantages.

Alternatively, preferably, the input shaft has an upper portion extended upward from the transaxle housing, and a cooling fan is provided on the upper portion of the input shaft so as to be disposed above the transaxle housing. Therefore, the space between a bottom of the transaxle and the grass-discharging duct for arranging the input pulley can be reduced so as to enable the vertical width of the grass-discharging duct to be further increased.

Another object of the invention is to provide a lawn tractor, which can increase the volume of a grass-discharging duct of a mower unit, thereby increasing the grass discharging (or collecting) speed of the mower unit.

To achieve the other object of the invention a lawn tractor comprises: a prime mover; a mower unit having a grass-discharging duct disposed at a substantially lateral center portion of the mower unit; left and right drive wheels disposed on lateral opposite sides of the grass-discharging duct; and left and right final transmission devices disposed on lateral opposite sides of the grass-discharging duct. A transaxle is disposed above the grass-discharging duct. The transaxle comprises: a transaxle housing; an input shaft having a lower portion extended downward from the transaxle housing; an input pulley provided on the lower portion of the input shaft so as to be disposed between the transaxle housing and the grass-discharging duct; and left and right output shafts projecting laterally from the transaxle housing opposite to each other so as to be drivingly connected to the respective left and right drive wheels through the respective left and right final transmission devices.

Preferably, the transaxle further comprises a hydraulic pump and a hydraulic motor. The hydraulic pump is disposed in the transaxle housing so as to be driven by rotating the input shaft. The hydraulic motor is disposed in the transaxle housing so as to be fluidly connected to the hydraulic pump and to drive the left and right output shafts. Therefore, when the lawn tractor is hydraulically driven by the transaxle, a large volume of the grass-discharging duct is ensured.

Preferably, a cooling fan is provided on the lower portion of the input shaft so as to be disposed between the transaxle housing and the grass-discharging duct. Therefore, a dead space around the lower portion of the input shaft is effectively used for arranging the cooling fan while ensuring the above advantages.

Alternatively, preferably, the input shaft has an upper portion extended upward from the transaxle housing, and a cooling fan is provided on the upper portion of the input shaft so as to be disposed above the transaxle housing. Therefore, the space between a bottom of the transaxle and the grass-discharging duct for arranging the input pulley can be reduced so as to enable the vertical width of the grass-discharging duct to be further increased.

These, further and other objects, features and advantages will appear more fully from the following description with reference to the accompanying drawings.

DETAILED DESCRIPTION OF THE INVENTION

Figure 1:
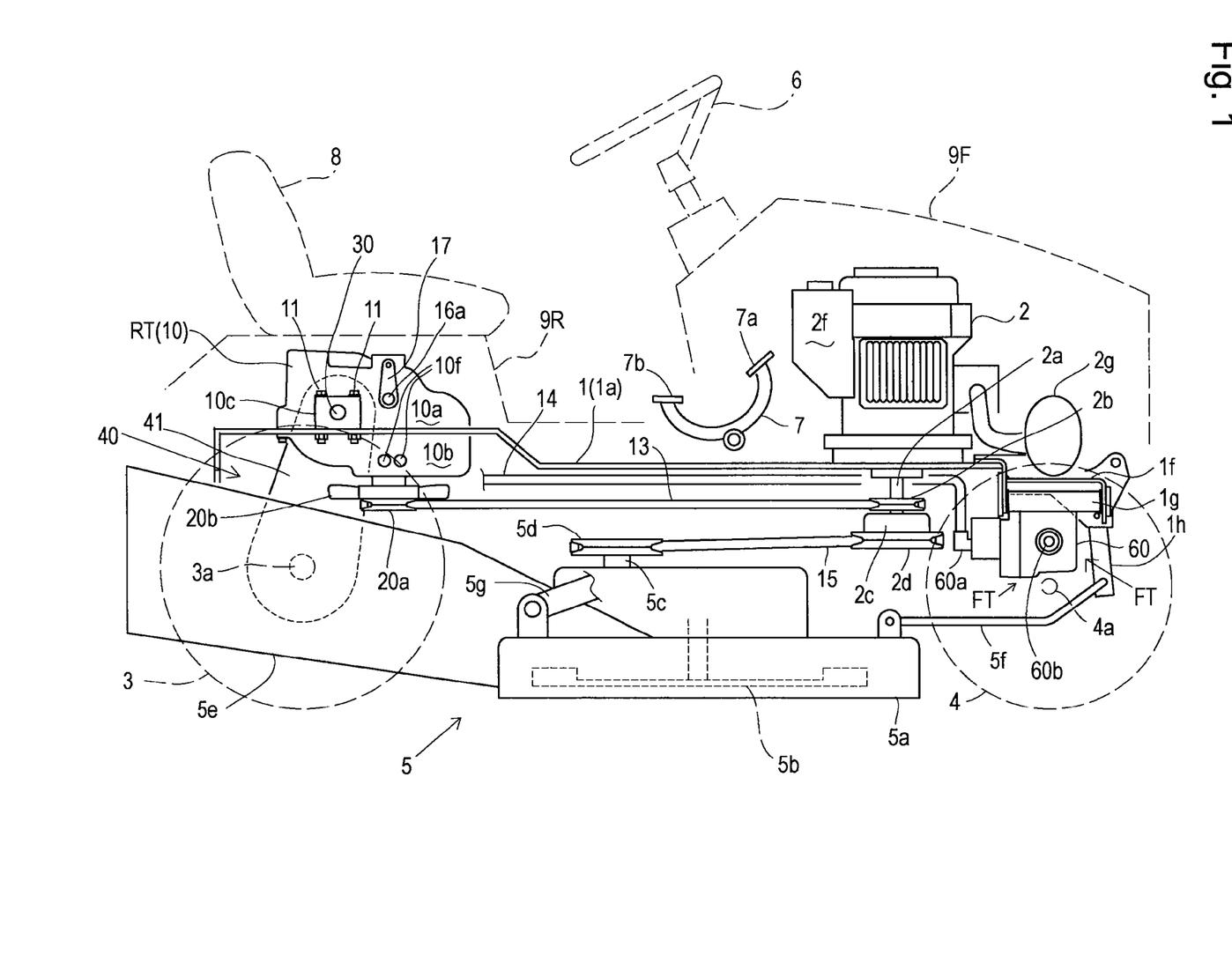
FIG. 1 is a schematic side view of a rear discharge lawn tractor equipped with a transaxle according to a first embodiment.
Figure 2:
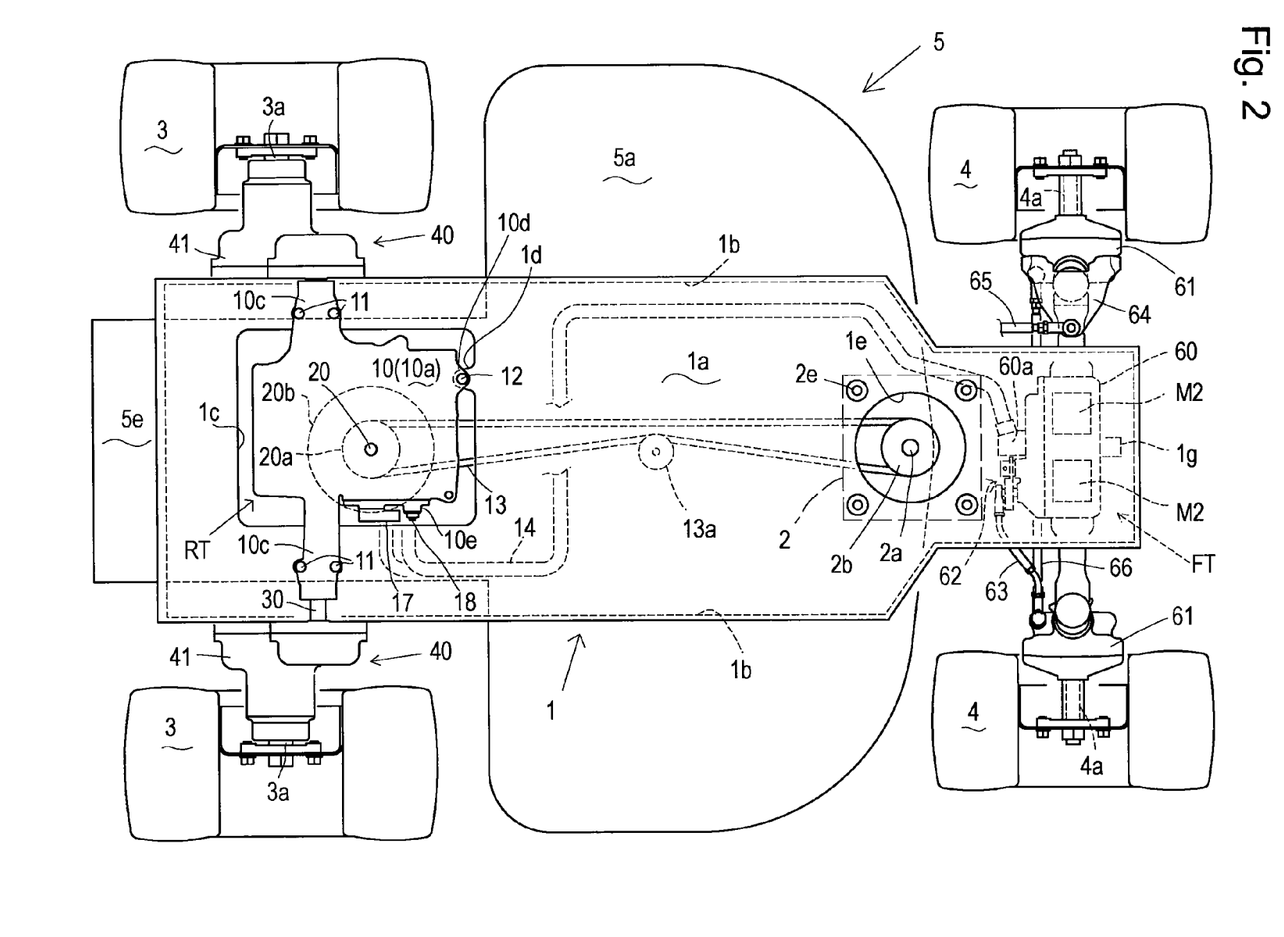
FIG. 2 is a schematic plan view of the lawn tractor equipped with the transaxle according to the first embodiment.
Figure 3:
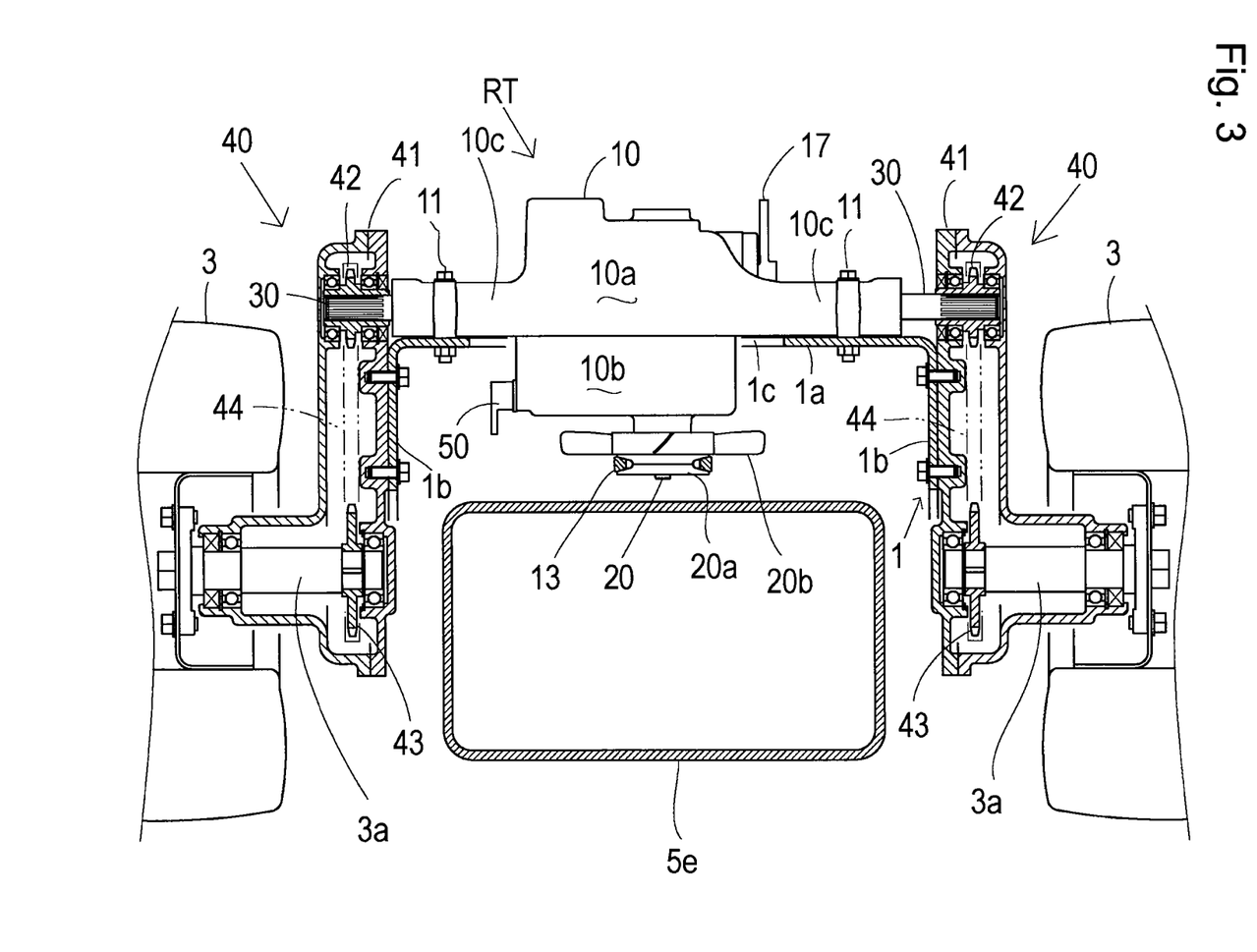
FIG. 3 is a sectional rear view of the lawn tractor equipped with the transaxle according to the first embodiment, showing the transaxle and left and right final transmission devices surrounding a grass-discharging duct.
Figure 4:
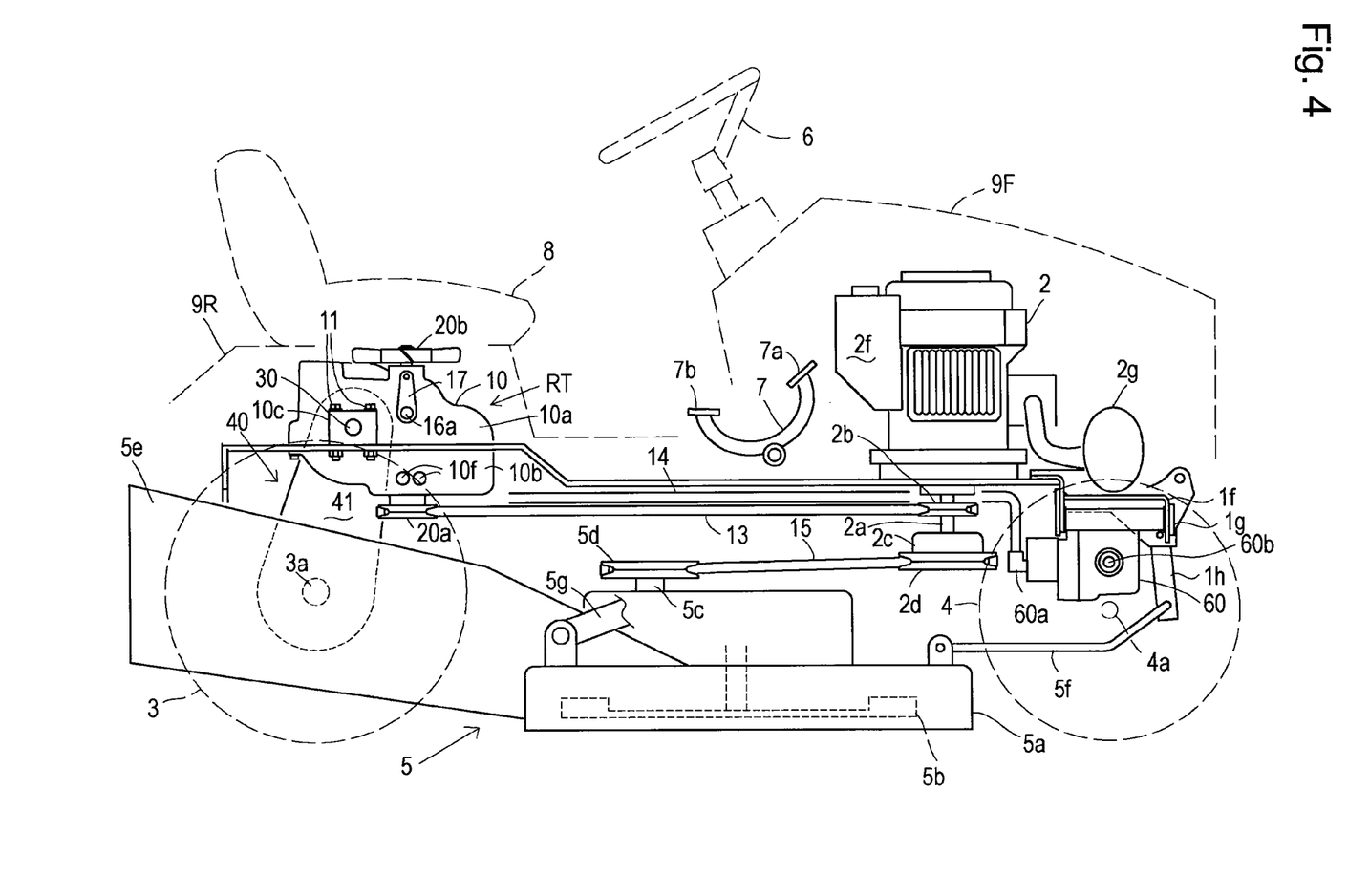
FIG. 4 is a schematic side view of the lawn tractor equipped with a transaxle according to a second embodiment.
Figure 5:
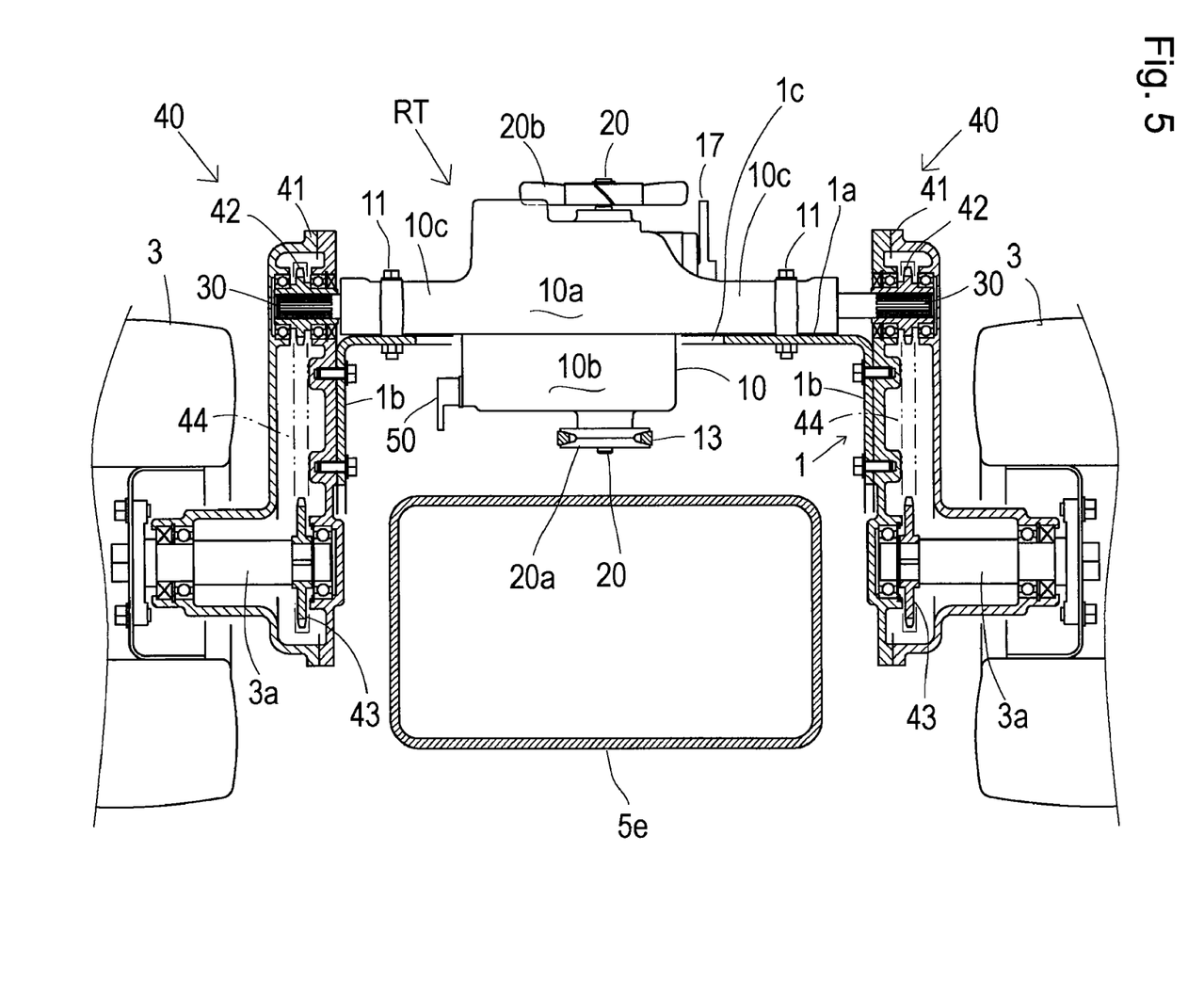
FIG. 5 is a sectional rear view of the lawn tractor equipped with the transaxle according to the second embodiment, showing the transaxle and left and right final transmission devices surrounding a grass-discharging duct.

FIGS. 1 to 3 illustrate a rear discharge lawn tractor equipped with a transaxle RT according to a first embodiment, and FIGS. 4 and 5 illustrate a rear discharge lawn tractor equipped with a transaxle RT according to a second embodiment. FIG. 2 is representative as a sectional plan view of the lawn tractor equipped with transaxle RT according to the second embodiment on the assumption that an alternative cooling fan 20b is disposed above a rear transaxle housing 10.

A common general structure of the rear discharge lawn tractor shared between the first and second embodiments will be described with reference to FIGS. 1 to 5. The rear discharge lawn tractor has a body frame 1 formed integrally with a horizontal plate 1a and vertical side plates 1b extended downward from front, rear, left and right edges of horizontal plate 1a.

As shown in FIG. 2, a vertically penetrating opening 1e is formed in a front portion of horizontal plate 1a of body frame 1. A vertical output shaft type engine 2 is attached onto an upper surface of horizontal plate 1a around opening 1e through vibration-isolating members 2e so as to be mounted upright from horizontal plate 1a of body frame 1. A fuel tank 2f is fixed on a rear portion of engine 2, and a muffler 2g is extended forward from engine 2.

As shown in FIGS. 1, 2 and 4, a vertical engine output shaft 2a is extended downward from engine 2 through opening 1e, and fixedly provided thereon with a traveling power output pulley 2b below horizontal plate 1a of body frame 1. Engine output shaft 2a is further extended downward from traveling power output pulley 2b and provided on a bottom end thereof with a working power output pulley 2d. A PTO solenoid clutch 2c is provided on the bottom end portion of engine output shaft 2a and drivingly interposed between traveling power output pulley 2b and working power output pulley 2d.

As shown in FIGS. 1 and 4, a bonnet 9F is disposed over a front portion of body frame 1 so as to enclose engine 2. A steering wheel 6 is extended upward from a rear end portion of bonnet 9F. A speed changing pedal 7 for changing the traveling speed and direction of the vehicle is disposed at a rear bottom portion of bonnet 9F behind engine 2. In this vehicle, speed changing pedal 7 is seesaw-like shaped so as to include a front depression plate 7a for setting variable forward traveling speed, and a rear depression plate 7b for setting variable backward traveling speed. Alternatively, individual pedals for respective changes in the forward traveling speed and in the backward traveling speed can be provided.

As shown in FIGS. 1 and 4, horizontal plate 1a is stepped at a fore-and-aft intermediate portion so as to have a higher rear portion with a vertically penetrating opening 1c shown in FIGS. 2, 3 and 5. A rear transaxle housing 10 of a rear (main) transaxle RT is vertically passed through opening 1c. In this regard, rear transaxle housing 10 is formed by vertically joining an upper half 10a and a lower half 10b to each other through a horizontal joint surface. The horizontal joint surface between upper and lower halves 10a and 10b is leveled with the upper surface of the higher rear portion of horizontal plate 1a of body frame 1. Upper half 10a is formed integrally with left and right shaft support portions 10c, which are extended laterally distally from left and right ends of opening 1c, when viewed in plan as shown in FIG. 2. Each of shaft support portions 10c is thickened at the distal end thereof so as to serve as bosses. The bosses whose bottom surfaces contact the upper surface of horizontal plate 1a are fastened to horizontal plate 1a by bolts 11. Further, as shown in FIG. 2, horizontal plate 1a of body frame 1 is formed integrally with a tab 1d extended rearward from a front edge of opening 1c, and a boss 10d projecting forward from a front bottom edge of upper half 10a is fastened onto tab 1d through a bolt 12, so as to receive a counter torque caused in rear transaxle housing 10 during traveling of the vehicle.

As shown in FIGS. 1 to 5, left and right final transmission devices 40 are disposed on respective lateral opposite sides of the higher rear portion of body frame 1 so as to be drivingly interposed between rear transaxle RT and rear wheels 3. Each of final transmission devices 40 includes a transmission casing 41 fixed onto an outer surface of each of left and right vertical side plates 1b. A top portion of each transmission casing 41 projects upward from horizontal plate 1a of body frame 1 so as to journal an output shaft 30 projecting from each shaft support portion 10c of rear transaxle housing 10. Each of transmission casings 41 is extended downward so as to journal an axle 3a of each of rear wheels 3 at a bottom portion thereof.

As shown in FIGS. 1 and 4, a rear cover 9R is disposed over the rear portion of body frame 1 so as to enclose rear transaxle RT. A driver's seat 8 is mounted on rear cover 9R.

As shown in FIGS. 1 to 5, a mower unit 5 is disposed below body frame 1. Mower unit 5 includes a mower deck 5a incorporating rotary blades 5b disposed between rear wheels 3 and front wheels 4. Mower unit 5 includes a grass-discharging duct 5e, which is extended rearward from mower deck 5a between left and right rear wheels 3, and projects rearward from a rear end of body frame 1. The lateral width of grass-discharging duct 5e is set close to the lateral distance between left and right transmission casings 41, and the left and right ends of grass-discharging duct 5e are equally spaced from the respective left and right transmission casings 41. Mower unit 5 may include a blower for blowing grass mowed by rotary blades 5b outward from grass-discharging duct 5e. A grass collection box (not shown) can be attached onto the rear end of body frame 1 so as to collect grass mowed by rotary blades 5b through grass-discharging duct 5e.

As shown in FIGS. 1 and 4, a front end portion of mower deck 5a is hung down through a mower link 5f from a mower bracket 1h extended downward from a front end of body frame 1. Lift arms 5g of a mower lift mechanism, having base ends pivoted on body frame 1, are pivotally connected to a rear portion of mower deck 5a, and driven by an actuation for raising and lowering mower deck 5a.

As shown in FIGS. 1 and 4, mower deck 5a supports a vertical mower input shaft 5c drivingly connected to rotary blades 5b and the blower. Mower input shaft 5c projects upward from mower deck 5a, and is fixedly provided thereon with a mower input pulley 5d, which is drivingly connected to working power output pulley 2d on engine output shaft 2a through a belt 15, thereby driving rotary blades 5b by power of engine 2.

As shown in FIGS. 1 and 3 to 5, a vertical input shaft 20 of rear transaxle RT is extended downward from a bottom of rear transaxle housing 10 into a space just above grass-discharging duct 5e, and is fixedly provided thereon with an input pulley 20a, which is drivingly connected to traveling power output pulley 2b on engine output shaft 2a through a belt 13, thereby driving rear wheels 3 by power of engine 2 through rear transaxle RT and final transmission devices 40. As shown in FIG. 2, a belt 13 is looped over a pulley 13a between pulleys 2b and 20a so as to be tensed.

As shown in FIGS. 1 and 4, a front end portion of body frame 1 in front of engine 2 is formed into a bracket 1f having a fore-and-aft horizontal center pin 1g. Muffler 2g extended forward from engine 2 is secured on bracket 1f. A front transaxle housing 60 of a front (auxiliary) transaxle FT is pivoted at a lateral center portion thereof on center pin 1g so as to be vertically swingable at left and right ends thereof. As shown in FIG. 2, left and right steering units 61 support respective axles 4a of left and right front wheels 4, and are steerably attached to the respective left and right ends of front transaxle housing 60, so that left and right front wheels 4 serve as steerable wheels.

As shown in FIG. 2, a steering arm 64 is fixed on a top portion of one of steering units 61. A steering link rod 65 operatively connected to steering wheel 6 (through a power steering mechanism) is pivoted at a front end thereof onto steering arm 64. A tie rod 66 is pivotally interposed between left and right steering units 61. Therefore, left and right steering units 61 with respective front wheels 4 are steered according to the turning direction and angle of steering wheel 6.

Left and right individual output shafts 60b, shown in FIGS. 1 and 4, are supported in front transaxle housing 60, and each of output shafts 60b is drivingly connected to each of front wheels 4 through a deceleration mechanism in each of steering units 61. As shown in FIG. 2, left and right hydraulic motors M2 are disposed in front transaxle housing 60, so as to drive respective output shafts 60b, thereby individually (differentially) driving respective front wheels 4. As shown in FIGS. 1 and 4, a pair of ports 10f are provided on a side of rear transaxle housing 10 (lower half 10b), and a pair of ports 60a are provided on a rear surface of front transaxle housing 60. A pair of hydraulic pressure fluid pipes 14 are interposed between ports 10f and ports 60a, so as to supply hydraulic motors M2 with hydraulic pressure fluid from rear transaxle housing 10 (i.e., a later-discussed hydraulic pump P in rear transaxle housing 10 serves as a hydraulic pressure source of hydraulic motors M2).

Hydraulic motors M2 are fluidly connected to hydraulic pump P in parallel, so that they can output differentially. At least one of hydraulic motors M2 is a variable displacement hydraulic motor with a cam mechanism 62 for changing the displacement according to turning of front wheels 4. In this regard, cam mechanism 62 is provided on the rear surface of front transaxle housing 60, and a detection link rod 63 is pivoted at one end thereof onto one of left and right steering units 61 (preferably, other than steering unit 61 with steering arm 64), and extended to be operatively connected to cam mechanism 62, so as to reduce the displacement of variable displacement hydraulic motor M2 according to an increase of the turning angle of corresponding steering unit 61. Consequently, during turning of the vehicle, the peripheral speed of front wheels 4 is increased larger than the peripheral speed of rear wheels 3 so as to prevent front wheels 4 from being dragged.

A traveling power transmission system around grass-discharging duct 5e will be described with reference to FIGS. 1 to 5. Due to rear transaxle RT being disposed above grass-discharging duct 5e, left and right vertical side surfaces of grass-discharging duct 5e are disposed close to inner surfaces of left and right vertical side plates 1b of body frame 1, i.e., left and right final transmission devices 40. No part exists in a narrow space between each of the left and right vertical surfaces of grass-discharging duct 5e and the inner surface of each of left and right side plates 1b of body frame 1. Therefore, the lateral width of grass-discharging duct 5e is close to the lateral width of body frame 1, so as to have a large volume in comparison with a grass-discharging duct disposed on one lateral side of a rear transaxle.

Grass-discharging duct 5e has a top surface slanted upwardly rearward so that the rear open end of grass-discharging duct 5e has a large vertical width. In this regard, the diameter of input pulley 20a on the bottom portion of input shaft 20 projecting downward from rear transaxle housing 10 is smaller than the fore-and-aft width of the bottom portion of rear transaxle housing 10 (lower half 10b), so that input pulley 20a is effectively disposed in the narrow dead space just above the upwardly rearward slanted top surface of grass-discharging duct 5e. Consequently, the bottom portion of rear transaxle housing 10 becomes as high as possible so that the bottom portion of input shaft 20 with input pulley 20a projecting downward from rear transaxle housing 10 is also as high as possible, so as to increase the slant angle of the top surface of grass-discharging duct 5e, i.e., increase the vertical width of the rear end of grass-discharging duct 5e, thereby increasing the volume of grass-discharging duct 5e. In correspondence to the high position of rear transaxle housing 10, as mentioned above, the rear portion of horizontal plate 1a of body frame 1 having opening 1c is stepped to be higher than the front portion of horizontal plate 1a of body frame 1, so as to hold rear transaxle housing 10.

With respect to each of final transmission devices 40, as shown in FIGS. 3 and 5, in transmission casing 41, a sprocket 42 is fixed on a distal end of output shaft 30, a sprocket 43 is fixed on a proximal end of axle 3a of rear wheel 3, and a chain 44 is looped over sprockets 42 and 43 so as to transmit the rotation of output shaft 30 to rear wheel 3. Alternatively, each of final transmission devices 40 may be a belt type transmission or a gear train.

The only different point between the first embodiment shown in FIGS. 1 to 3 and the second embodiment shown in FIGS. 4 and 5 is a position of a cooling fan 20b on input shaft 20 of rear transaxle RT.

Figure 7:
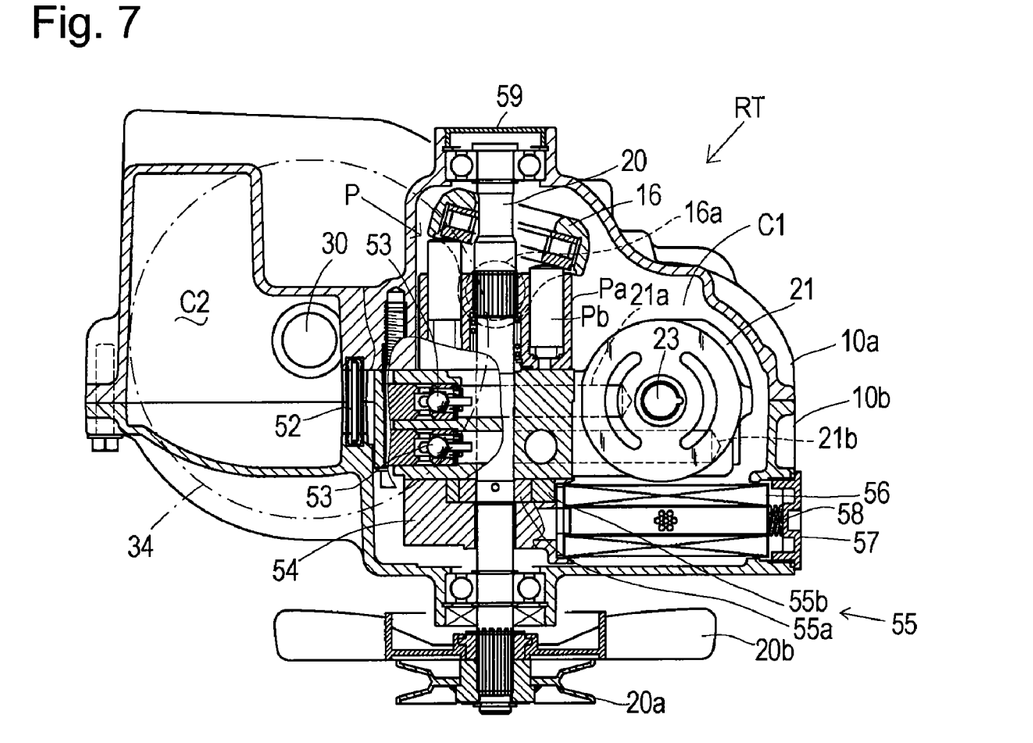
FIG. 7 is a sectional side view of the transaxle according to the first embodiment shown in FIGS. 1 to 3.

Referring to the first embodiment shown in FIGS. 1 to 3 and 7, a cooling fan 20b is fixed on the lower portion of input shaft 20 projecting downward from rear transaxle housing 10 (lower half 10b) adjacent to input pulley 20a. Preferably, as shown in FIGS. 1, 3 and 7, cooling fan 20b is disposed just above input pulley 20a so as to prevent cooling fan 20b, which is diametrically larger (i.e., horizontally wider) than input pulley 20a, from interfering with grass-discharging duct 5e therebelow, and to ensure a large vertical width of grass-discharging duct 5e. Alternatively, cooling fan 20b may be disposed below input pulley 20a. Further preferably, cooling fan 20b according to the first embodiment blows air upward so as to cool rear transaxle housing 10 thereabove.

Referring to the second embodiment shown in FIGS. 4 and 5 and 8, a top portion of input shaft 20 projects upward from rear transaxle housing 10 (upper half 10a), and cooling fan 20b is fixed on the top portion of input shaft 20 projecting upward from rear transaxle housing 10 vertically opposite to input pulley 20a disposed below rear transaxle housing 10. Preferably, cooling fan 20b according to the second embodiment blows air downward so as to cool rear transaxle housing 10 therebelow. This downward air flow prevents mowed and spread grass from entering a vehicle body above body frame 1, thereby keeping the interior of the vehicle body clean.

Alternatively, a pair of upper and lower cooling fans may be provided on upper and lower portions of input shaft 20 projecting upward and downward from rear transaxle housing 10, respectively. In this structure, the lower cooling fan blows air upward through opening 1c around rear transaxle housing 10, and the upper cooling fan blows air downward and returns the air blown upward from the lower cooling fan so as to enhance the effect of cooling rear transaxle housing 10.

Figure 8:
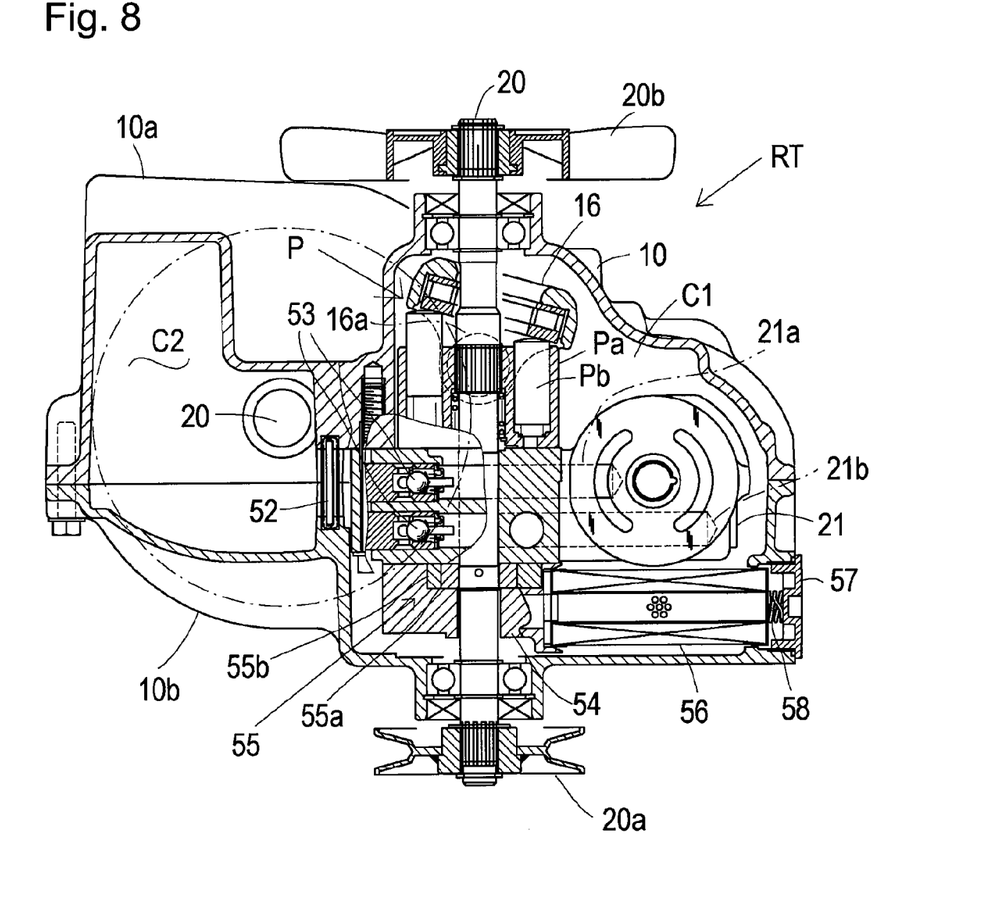
FIG. 8 is a sectional side view of the transaxle according to the second embodiment shown in FIGS. 4 and 5.

An inner structure of rear transaxle housing 10 shown in FIGS. 6 to 9 is common between the first and second embodiments, while the position of cooling fan 20b shown in FIG. 7 is different from that shown in FIG. 8. The common inner structure of rear transaxle housing 10 shown in FIGS. 6 to 9 will be described.

A side cover 10e, supporting a pivot shaft (later-discussed trunnion) 16a of a speed control arm 17 and a retaining pin 18, is fixed onto mutually joined upper and lower halves 10a and 10b so as to complete rear transaxle housing 10. Rear transaxle housing 10 is filled therein with fluid (serving as lube for gears and as hydraulic pressure fluid for an HST), so as to serve as a fluid sump. An inner space of rear transaxle housing 10 is divided into an HST chamber C1 and a gear chamber C2 by a vertical partition wall formed of vertically joined upper and lower halves 10a and 10b.

HST chamber C1 incorporates an HST (hydrostatic transmission) including a hydraulic pump P, a hydraulic motor M1 and a center section 21. Gear chamber C2 incorporates left and right output shafts 30, a differential gear unit 33 disposed between left and right output shafts 30, and a deceleration gear train 31 drivingly interposed between hydraulic motor M1 and differential gear unit 33.

Figure 6:
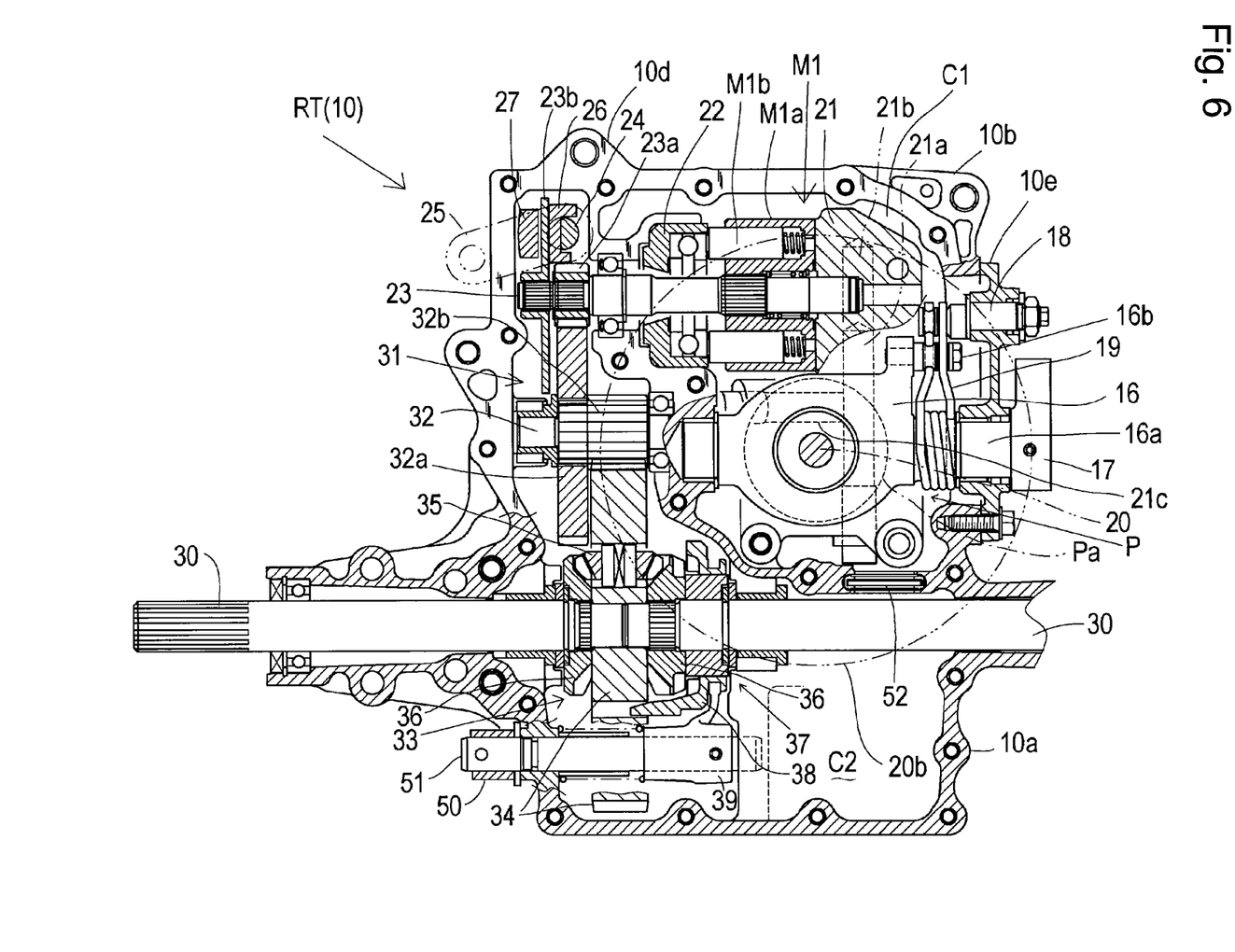
FIG. 6 is a sectional plan view of the transaxle according to either the first and second embodiment.

A fluid filter 52, e.g., a magnet disk, is fitted in an opening formed in the partition wall so as to remove impurities, such as metal powder caused by rubbing of gears, from fluid in gear chamber C2 before the fluid enters HST chamber C1 through the opening.

A structure of the HST will be described with reference to FIGS. 6 to 9. Center section 21 is fixed in HST chamber C1. Center section 21 includes an upward horizontal pump mounting surface and a vertical motor mounting surface. When viewed in plan, the vertical motor mounting surface is extended perpendicular to the longitudinal direction of output shafts 30, and disposed opposite to output shafts 30 with respect to the pump mounting surface. Center section 21 rotatably supports vertical input (pump) shaft 20 at the center of the horizontal pump mounting surface, and rotatably supports a horizontal motor shaft 23 disposed at the center of the vertical motor mounting surface in parallel to output shafts 30.

Hydraulic pump P includes a cylinder block Pa relatively unrotatably engaged on input shaft 20 (serving as a pump shaft) and slidably rotatably fitted onto the pump mounting surface of center section 21. Vertical pistons Pb are disposed around input shaft 20 and reciprocally movably fitted into cylinder block Pa. A trunnion type movable swash plate 16 is disposed above cylinder block Pa and pressed against heads of pistons Pb. Movable swash plate 16 has a pair of opposite trunnion shafts 16a disposed in parallel to output shafts 30. One of trunnion shafts 16a is rotatably supported by the partition wall portion of upper half 10a of rear transaxle housing 10, and the other of trunnion shafts 16a is rotatably supported by side cover 10e. In this way, movable swash plate 16 is rotatable around trunnion shafts 16a.

Input shaft 20 is passed through a central opening of movable swash plate 16, and is journalled in a cylindrical support portion formed on a top of upper half 10a of rear transaxle housing 10 through a bearing. In the first embodiment, as shown in FIG. 7, the top of input shaft 20 ends in the cylindrical support portion of upper half 10a of rear transaxle housing 10, and a cap 59 closes the top opening of the cylindrical support portion above the top of input shaft 20. In the second embodiment, as shown in FIG. 8, the top opening of the cylindrical support portion is not closed by cap 59, and the top portion of input shaft 20 projects upward from the top opening so as to be fixedly provided thereon with cooling fan 20b.

Speed control arm 17 is fixed on a distal end of trunnion shaft 16a outside of side cover 10e, and operatively connected to above-mentioned speed changing pedal 7. In rear transaxle housing 10, a neutral returning spring 19 is wound around trunnion shaft 16a supported by side cover 10e. Both end portions of spring 19 are twisted, cross each other, and are extended. A push pin 16b fixed to movable swash plate 16 and retaining pin 18 fixed to side cover 10e are disposed between the extended end portions of spring 19.

When speed changing pedal 7 is disposed at its neutral position, movable swash plate 16 is disposed at its neutral position, and the both ends of spring 19 press and pinch pins 16a and 18 therebetween so as to hold movable swash plate 16 at the neutral position determined by retaining pin 18. When either front or rear depression plate 7a or 7b of speed changing pedal 7 is depressed, movable swash plate 16 rotates in one of opposite directions from the neutral position, whereby push pin 16b pushes one end of spring 19 away from the other end of spring 19 retained by retaining pin 18 so as to cause a force of spring 19 biasing movable swash plate 16 toward the neutral position. Therefore, when speed changing pedal 7 is released from the depression, movable swash plate 16 and speed changing pedal 7 return to their respective neutral positions swiftly.

Retaining pin 18 is an eccentric shaft, and normally fastened at an outer threaded end portion thereof onto an outer surface of side cover 10e by a nut. When the neutral position of movable swash plate 16 is deviated from the neutral position of speed changing pedal 7 and speed control arm 17, the nut is loosened and retaining pin 18 is rotated so as to correct the deviation of the neutral position.

Hydraulic motor M1 includes a cylinder block M1a relatively unrotatably engaged on motor shaft 23 and slidably rotatably fitted onto the motor mounting surface of center section 21. Horizontal pistons M1b are disposed around motor shaft 23 and reciprocally movably fitted into cylinder block M1a. A fixed swash plate 22 is fixed onto the partition wall in rear transaxle housing 10 and pressed against heads of pistons M1b. Motor shaft 23 is passed through a central opening of fixed swash plate 22, and is journalled by the partition wall through a bearing so as to project into gear chamber C2.

In center section 21, a pair of kidney ports are opened at the pump mounting surface, and a pair of kidney ports are opened at the motor mounting surface. Center section 21 is formed therein with a pair of upper and lower parallel horizontal fluid holes 21a and 21b extended perpendicular to output shafts 30 when viewed in plan. Upper fluid hole 21a is opened to one kidney port at the pump mounting surface and to one kidney port at the motor mounting surface. Lower fluid hole 21b is opened to the other kidney port at the pump mounting surface through a vertically slant fluid hole 21c extended in parallel to output shafts 30 when viewed in plan, and is extended longer than upper fluid hole 21a so as to be opened to the other kidney port at the motor mounting surface.

A motor output gear 23a and a brake disk 23b are fixed on motor shaft 23 in gear chamber C2. Brake disk 23b is disposed between brake shoes 26 and 27. A vertical brake operation shaft 24 is rotatably supported by rear transaxle housing 10, and formed with a cam surface facing brake shoe 26. A top portion of brake operation shaft 24 projects upward from rear transaxle housing 10 so as to be fixedly provided thereon with a brake arm 25. A brake operation device (not shown), e.g., a brake pedal disposed adjacent to speed changing pedal 7 shown in FIGS. 1 and 4, is operatively connected to brake arm 25. When the brake operation device is operated for braking (the brake pedal is depressed), brake operation shaft 24 is rotated so as to slant the cam surface thereof against brake shoe 26, so as to press brake shoe 26 against brake disk 23b, i.e., press brake disk 23b between brake shoes 26 and 27, thereby braking motor shaft 23, whereby left and right output shafts 30, and left and right rear wheels 3 are stopped.

Referring to FIG. 6, a horizontal counter shaft 32 is journalled in gear chamber C2, and disposed in parallel to output shafts 30. A diametrically small and axially long gear 32b is fixed on counter shaft 32. A diametrically large gear 32a is relatively unrotatably fitted on a portion of diametrically small gear 32b, and meshes with motor output gear 23a. The remaining portion of diametrically small gear 32b meshes with a bull gear 34 of differential gear unit 33. In this way, the gear train between motor shaft 23 and bull gear 34 through counter shaft 32 serves as two-stepped deceleration gear train 31.

Referring to FIG. 6, in differential gear unit 33, proximal ends of output shafts 30 are relatively rotatably fitted into a center axial hole bull gear 34. A pinion 35 is pivoted in bull gear 34, so as to have a pivot axis disposed radially of bull gear 34. Differential side gears 36 are fixed on respective output shafts 30, disposed along respective left and right side surfaces of bull gear 34, and mesh with pinion 35.

Referring to FIG. 6, differential gear unit 33 is provided with a differential lock mechanism 37. Differential lock mechanism 37 includes a differential lock slider 38 axially slidably fitted on one of output shafts 30. A portion of differential lock slider 38 is constantly and slidably fitted in bull gear 34. Differential lock slider 38 is selectively engaged or disengaged into and from a recess formed on a back surface of differential side gear 36 fixed on the one of output shafts 30, depending on the axial slide on output shaft 30. A horizontal differential lock shaft 51 is disposed in parallel to output shafts 30, and journalled by rear transaxle housing 10 (lower half 10b). Differential lock slider 38 is connected to differential clutch slider 38 through a fork 39. A differential lock arm 50 is fixed on an outer end of differential lock shaft 51 outside rear transaxle housing 10, as shown in FIGS. 3, 5 and 6.

Differential lock arm 50 is operatively connected to a differential lock operation device (not shown), such as a pedal disposed adjacent to driver's seat 8, which is switchable between a differential position and a differential lock position. When the differential lock operation device is disposed at the differential position, differential lock slider 38 is disengaged from differential side gear 36 so as to allow output shafts 30 to differentially rotate. When the differential lock operation device is disposed at the differential lock position, differential lock slider 38 is engaged with differential side gear 36 so as to lock output shafts 30 to each other through bull gear 34, thereby preventing output shafts 30 from differentially rotating.

Figure 9:
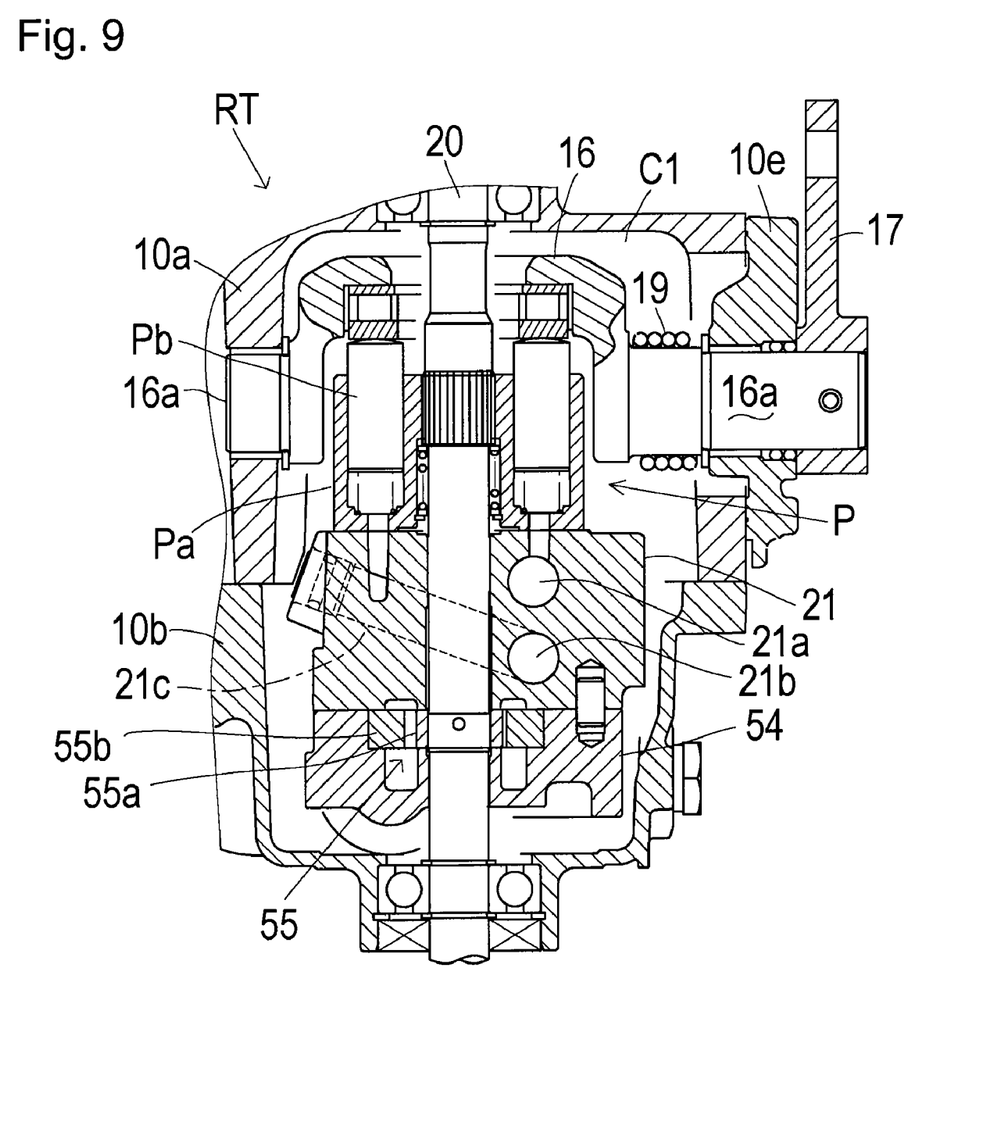
FIG. 9 is a cross sectional view taken in XI-XI line of either FIG. 7 or 8.

Referring to FIG. 7 or 8 and FIG. 9, a charge pump 55 and a structure therearound will be described. A pair of charge check valves 53 are fitted in respective upper and lower fluid holes 21a and 21b in center section 21. A top surface of a charge pump casing 54 is fixed to a horizontal bottom surface of center section 21. Center section 21 is formed with a pump chamber recessed downward from the top surface. An inner rotor 55a and an outer rotor 55b are disposed in the pump chamber so as to constitute trochoidal charge pump 55. Inner rotor 55a is fixed on input shaft 20 extended downward from center section 21, and outer rotor 55b meshing with inner rotor 55a rotates on its own axis in charge pump casing 54 according to the rotation of inner rotor 55a together with input shaft 21.

A delivery port of charge pump 55 is connected to a bottom opening of a charge fluid port formed in center section 21 at the bottom surface of center section 21, and the charge fluid port is connected to fluid holes 21a and 21b through respective charge check valves 53. In this way, fluid delivered from charge pump 55 is supplied into hydraulically depressed one of fluid holes 21a and 21b through opened corresponding charge check valve 53.

Charge pump casing 54 has formed therein a suction port extended downward from the pump chamber and has an opening horizontally outward to the fluid sump in rear transaxle housing 10. An outer wall of lower half 10b of rear transaxle housing 10 is bored by a horizontally penetrating hole facing the opening of the suction port. The hole is plugged by a cap 57, and a horizontal cylindrical fluid filter 56 is disposed between cap 57 and the opening of the suction port. Fluid filter 56 is inserted or removed into and from rear transaxle housing 10 through the hole from which cap 57 is removed. A spring 58 is interposed between fluid filter 56 and cap 57 so as to press and fit fluid filter 56 onto charge pump casing 54. In this way, charge pump 55 absorbs fluid from the fluid sump in rear transaxle housing 10 through fluid filter 56.

Figure 10:
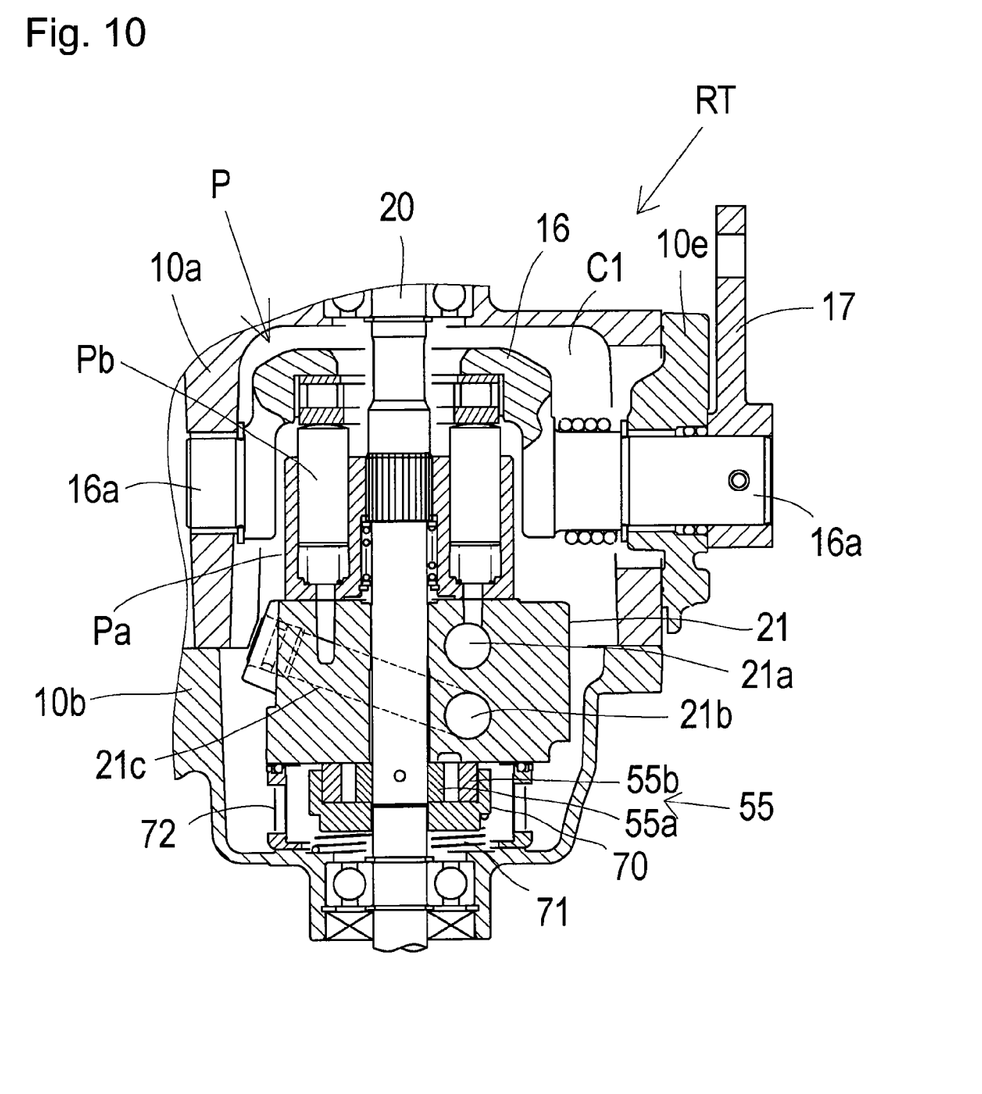
FIG. 10 is a cross sectional view taken in XI-XI line of either FIG. 7 or 8 when the transaxle is provided with an alternative structure of a charge pump.

An alternative structure of charge pump 55 in rear transaxle housing 10 will be described with reference to FIG. 10. A charge pump casing 70 is not fixed to center section 21. Charge pump casing 70 is formed with a pump chamber recessed downward from a top surface thereof. Inner and outer rotors 55a and 55b, constituting trochoidal charge pump 55, are rotatably slidably fitted into the pump chamber. Top surfaces of inner and outer rotors 55a and 55b project upward from the top surface of charge pump casing 54 and rotatably slidably abut against the horizontal bottom surface of center section 21.

A compressed spring 71 is interposed between a bottom surface of charge pump casing 70 and a bottom wall of lower half 10b of rear transaxle housing 10 so as to bias charge pump casing 70 upward, thereby slidably and rotatably pressing the top surfaces of inner and outer rotors 55a and 55b against the horizontal bottom surface of center section 21. The charge pressure of charge pump 55 is defined by the biasing force of spring 71 so that excessive pressure of fluid delivered from charge pump 55 expands a gap between the top surfaces of rotors 55a and 55b and the bottom surface of center section 21 and the fluid of the excessive pressure leaks through the gap into the fluid sump in rear transaxle housing 10.

A vertical cylindrical fluid filter 72 is interposed between the bottom surface of center section 21 and the bottom wall of lower half 10b of rear transaxle housing 10, and disposed around charge pump 55 and charge pump casing 70, so that fluid is supplied to charge pump 55 from the fluid sump in rear transaxle housing 10 through fluid filter 72 and a fluid passage formed in charge pump casing 70. Charge pump 55 supplies fluid to either fluid hole 21a or 21b through corresponding charge check valve 53, similar to charge pump 55 shown in FIG. 9.

Rear transaxle housing 10 is provided with ports 10f (shown in FIGS. 1 and 4, and not shown in FIGS. 6 to 10) for supplying fluid to hydraulic motors M2 in front transaxle FT. Center section 21 is formed so as to fluidly connect the HST closed circuit, i.e., fluid holes 21a, 21b and 21c between hydraulic pump P and motor M1, to ports 10f.

It is further understood by those skilled in the art that the foregoing description is a preferred embodiment of the disclosed apparatus and that various changes and modifications may be made in the invention without departing from the scope thereof defined by the following claims.

What is claimed is:

1. A transaxle for a lawn tractor, the lawn tractor including a prime mover, a mower unit, a grass-discharging duct extended from the mower unit at a substantially lateral center portion of the lawn tractor, left and right drive wheels having respective axles disposed on lateral opposite sides of the grass-discharging duct, and left and right final transmission devices disposed on lateral opposite sides of the grass-discharging duct, the transaxle comprising:
   a transaxle housing disposed above the grass-discharging duct, wherein the left and right final transmission devices are connected at upper portions thereof to respective left and right ends of the transaxle housing;
   an input shaft having a lower portion extended downward from the transaxle housing;
   an input pulley for receiving power from the prime mover, wherein the input pulley is provided on the lower portion of the input shaft so as to be disposed between the transaxle housing and the grass-discharging duct; and
   left and right output shafts projecting laterally from the transaxle housing opposite to each other above the grass-discharging duct, wherein the axles of the left and right drive wheels are disposed below the respective left and right output shafts on respective left and right sides of the grass-discharging duct, wherein the left final transmission device is interposed between the left output shaft and the axle of the left drive wheel on the left side of the grass-discharging duct, and wherein the right final transmission device is interposed between the right output shaft and the axle of the right drive wheel on the right side of the grass-discharging duct.

2. The transaxle according to claim 1, further comprising:
   a hydraulic pump disposed in the transaxle housing so as to be driven by rotating the input shaft; and
   a hydraulic motor disposed in the transaxle housing so as to be fluidly connected to the hydraulic pump and to drive the left and right output shafts.

3. The transaxle according to claim 1, further comprising:
   a cooling fan provided on the lower portion of the input shaft so as to be disposed between the transaxle housing and the grass-discharging duct.

4. The transaxle according to claim 1, wherein the input shaft has an upper portion extended upward from the transaxle housing, and wherein a cooling fan is provided on the upper portion of the input shaft so as to be disposed above the transaxle housing.

5. A lawn tractor comprising:
   a prime mover;
   a mower unit;
   a grass-discharging duct extended from the mower unit at a substantially lateral center portion of the lawn tractor;
   left and right drive wheels having respective axles disposed on lateral opposite sides of the grass-discharging duct;
   left and right final transmission devices disposed on lateral opposite sides of the grass-discharging duct; and
   a transaxle disposed above the grass-discharging duct, wherein the transaxle comprises:
      a transaxle housing;
      an input shaft having a lower portion extended downward from the transaxle housing;
      an input pulley for receiving power from the prime mover, wherein the input pulley is provided on the lower portion of the input shaft so as to be disposed between the transaxle housing and the grass-discharging duct; and
      left and right output shafts projecting laterally from the transaxle housing opposite to each other above the grass-discharging duct, wherein the axles of the left and right drive wheels are disposed below the respective left and right output shafts on respective left and right sides of the grass-discharging duct, wherein the left final transmission device is interposed between the left output shaft and the axle of the left drive wheel, and wherein the right final transmission is interposed between the right output shaft and the axle of the right drive wheel.

6. The lawn tractor according to claim 5, further comprising:
   a hydraulic pump disposed in the transaxle housing so as to be driven by rotating the input shaft; and a hydraulic motor disposed in the transaxle housing so as to be fluidly connected to the hydraulic pump and to drive the left and right output shafts.

7. The lawn tractor according to claim 5, further comprising:

a cooling fan provided on the lower portion of the input shaft so as to be disposed between the transaxle housing and the grass-discharging duct.

8. The lawn tractor according to claim 5, wherein the input shaft has an upper portion extended upward from the transaxle housing, and wherein a cooling fan is provided on the upper portion of the input shaft so as to be disposed above the transaxle housing.

9. A lawn tractor comprising:

a frame;

a prime mover mounted upward from the frame and having an output shaft and an output pulley on the output shaft below the frame;

a mower unit disposed below the frame;

a grass-discharging duct extended from the mower unit at a substantially lateral center portion of the tractor below the frame;

left and right drive wheels disposed on lateral opposite sides of the frame and on lateral opposite sides of the grass-discharging duct; and a transaxle supported by the frame and disposed above the grass-discharging duct, wherein the transaxle comprises:

a transaxle housing;

an input shaft having a lower portion extended downward from the transaxle housing;

an input pulley provided on the lower portion of the input shaft so as to be disposed between the lowest end of the transaxle housing and the grass-discharging duct and to be drivingly connected to the output pulley of the prime mover through a belt disposed below the frame; and left and right output shafts projecting laterally from the transaxle housing opposite to each other so as to be drivingly connected to the respective left and right drive wheels.

10. The lawn tractor according to claim 9, further comprising:

a hydraulic pump disposed in the transaxle housing so as to be driven by rotating the input shaft; and a hydraulic motor disposed in the transaxle housing so as to be fluidly connected to the hydraulic pump and to drive the left and right output shafts.

11. The lawn tractor according to claim 9, further comprising:

a cooling fan provided on the lower portion of the input shaft so as to be disposed between the transaxle housing and the grass-discharging duct.

12. The lawn tractor according to claim 9, wherein the input shaft has an upper portion extended upward from the transaxle housing, and wherein a cooling fan is provided on the upper portion of the input shaft so as to be disposed above the transaxle housing.

* * * * *